(12) United States Patent
Gallipeo

(10) Patent No.: US 11,732,526 B2
(45) Date of Patent: Aug. 22, 2023

(54) SHEAR STRESS REDUCTION IN ELECTROCHROMIC DEVICE ASSEMBLIES

(71) Applicant: Kinestral Technologies, Inc., Hayward, CA (US)

(72) Inventor: John Gallipeo, Hayward, CA (US)

(73) Assignee: HALIO, INC., Hayward, CA (US)

( * ) Notice: Subject to any disclaimer, the term of this patent is extended or adjusted under 35 U.S.C. 154(b) by 531 days.

(21) Appl. No.: 16/834,856

(22) Filed: Mar. 30, 2020

(65) Prior Publication Data

US 2020/0310212 A1 Oct. 1, 2020

Related U.S. Application Data

(60) Provisional application No. 62/824,906, filed on Mar. 27, 2019.

(51) Int. Cl.
| | |
|---|---|
| *E06B 3/66* | (2006.01) |
| *E06B 3/67* | (2006.01) |
| *E06B 3/663* | (2006.01) |
| *E06B 9/24* | (2006.01) |
| *G02F 1/153* | (2006.01) |
| *G02F 1/161* | (2006.01) |

(52) U.S. Cl.
CPC ........ *E06B 3/6617* (2013.01); *E06B 3/66309* (2013.01); *E06B 3/66352* (2013.01); *E06B 3/67* (2013.01); *E06B 2009/2476* (2013.01); *G02F 1/1533* (2013.01); *G02F 1/161* (2013.01)

(58) Field of Classification Search
CPC .............. E06B 3/6617; E06B 3/66309; E06B 3/66352; E06B 3/67; E06B 3/6722
See application file for complete search history.

(56) References Cited

U.S. PATENT DOCUMENTS

| | | | |
|---|---|---|---|
| 2011/0051221 A1* | 3/2011 | Veerasamy | G02F 1/1533 359/275 |
| 2013/0040079 A1* | 2/2013 | Caliaro | E06B 3/66309 428/34 |
| 2014/0043668 A1* | 2/2014 | Bergh | G02F 1/153 264/1.7 |

(Continued)

FOREIGN PATENT DOCUMENTS

| | | | |
|---|---|---|---|
| CH | 449919 A | * 1/1968 | |
| DE | 4112826 A1 | * 10/1992 | |
| DE | 202012002722 U1 | * 8/2012 | ....... B32B 17/10055 |

*Primary Examiner* — Christine T Cajilig

(57) ABSTRACT

An electrochromic integrated glazing unit (IGU) comprises an electrochromic lite, a glass lite, a spacer, and a sealant. The electrochromic lite can have a first piece of carrier glass, a second piece of carrier glass, and an electrochromic device disposed between them, where the first and second pieces of carrier glass can be offset such that the first piece of carrier glass extends farther than both the second piece of carrier glass and the electrochromic device along a first edge of the electrochromic lite. A sealant can be disposed between the first piece of carrier glass and the glass lite along a first edge of the electrochromic IGU and further disposed between the second piece of carrier glass and the glass lite. An electrochromic laminated glass unit (LGU) with a similar electrochromic lite can contain one or more shear blocks disposed at a first edge of the electrochromic LGU.

9 Claims, 10 Drawing Sheets

(56) References Cited

U.S. PATENT DOCUMENTS

| | | | | |
|---|---|---|---|---|
| 2015/0030789 | A1* | 1/2015 | Matsumoto | C03C 3/068 |
| | | | | 428/34 |
| 2015/0345208 | A1* | 12/2015 | Boulanger | E06B 3/67391 |
| | | | | 428/34 |
| 2018/0004060 | A1* | 1/2018 | Yoshimura | C25B 11/03 |
| 2018/0011383 | A1* | 1/2018 | Higashihara | B32B 17/10513 |
| 2019/0249485 | A1* | 8/2019 | Jeong | F21V 33/0044 |

* cited by examiner

SHEAR STRESS REDUCTION IN ELECTROCHROMIC DEVICE ASSEMBLIES

BACKGROUND

Electrochromic devices, which change in optical transmissivity as a result of applied voltage and current, are in use today in electrochromic windows and in automotive mirrors. Windows for buildings are often made as integrated glazing units (IGUs), which provide thermal insulation for the building and have an inner pane of glass and an outer pane of glass held apart by a spacer. A secondary seal typically surrounds the spacer. This works well for integrated glazing units of ordinary windows without electrochromic devices, with the spacer and the secondary seal hermetically sealing the two panes of glass and preventing moisture condensation in the inner space between the two panes. Electrical connections to bus bars of electrochromic devices pose design challenges, in an integrated glazing unit that should maintain hermetic sealing.

Electrochromic device assemblies can also be attached or laminated to additional pieces of glass or plastic to incorporate into different types of products. For example, an electrochromic device fabricated on a single sheet of glass, which is not heat strengthened or tempered, can be laminated to a second piece of tempered glass, and that laminated glass assembly can be attached to a glass lite via a spacer and secondary seal to form an IGU. Laminating a device substrate, which is not heat strengthened or tempered, to a piece of tempered glass increases the strength of the IGU to tolerate the required stresses experienced in operation. By way of further example, an electrochromic device with electrochromic materials disposed between two pieces of glass, which are not heat strengthened or tempered, can be laminated to a third piece of tempered glass, and that three piece of glass assembly can be attached to a glass lite using a spacer and secondary seal to form an IGU.

SUMMARY

In some embodiments, an electrochromic integrated glazing unit (IGU) comprises an electrochromic lite, a glass lite, a spacer, and a sealant. The electrochromic lite can comprise a first piece of carrier glass, a second piece of carrier glass, and an electrochromic device disposed between the first piece of carrier glass and the second piece of carrier glass. The first and second pieces of carrier glass can be offset such that the first piece of carrier glass extends farther than both the second piece of carrier glass and the electrochromic device along a first edge of the electrochromic lite. The spacer can be disposed between the second piece of carrier glass and the glass lite, and the sealant can be disposed between the first piece of carrier glass and the glass lite along a first edge of the electrochromic IGU. Furthermore, in some embodiments, the sealant is further disposed between the second piece of carrier glass and the glass lite.

In some embodiments, an electrochromic laminated glass unit (LGU) comprises a first substrate laminated to a first piece of carrier glass, a second substrate laminated to a second piece of carrier glass, a first electrochromic material disposed between the first and the second substrates, and one or more shear blocks. The first and second pieces of carrier glass can be offset such that the first piece of carrier glass extends farther than the second piece of carrier glass in at least one dimension. The first piece of carrier glass can also extend farther than the first substrate, the second substrate and the electrochromic device in the at least one dimension.

The one or more shear blocks can be disposed at a first edge of the electrochromic LGU, adjacent to both the first and second pieces of carrier glass, at the edge where the first and second pieces of carrier glass are offset. Furthermore, in some embodiments, the second piece of carrier glass is supported by the shear blocks when the electrochromic LGU is oriented vertically and is resting on the first edge of the electrochromic LGU.

DETAILED DESCRIPTION

Electrochromic (EC) device assemblies, including integrated glazing units (IGUs) and laminated glass units (LGUs), are described with details of shear stress reduction, in various embodiments. Electrochromic devices can be laminated to one or more pieces of carrier glass, and those pieces of carrier glass can be offset from one another in one or more lateral directions. For purposes of explanation, a lateral direction is considered parallel to a plane of, or tangent to, a main body of the IGU or LGU.

In some embodiments, an IGU or LGU contains two pieces of carrier glass that are offset along a first edge of the IGU or LGU, such that the first piece of carrier glass extends farther than the second piece of carrier glass along the first edge. In such embodiments, when the IGU or LGU is oriented vertically with the first edge of the electrochromic IGU oriented down (i.e., wherein the first edge is a support edge), the IGU or LGU will be supported by the piece of carrier glass that extends farther along the first edge. For purposes of explanation, an IGU or LGU is oriented vertically when the main body of the IGU or LGU is perpendicular (or approximately perpendicular) to a supporting surface (e.g., the ground, or the bottom of a window opening in a building). In some embodiments, the IGU or LGU is resting on the first edge. An IGU or LGU can be said to be resting on (or supported by) the first edge when the IGU or LGU is oriented vertically with the first edge at the bottom of the IGU or LGU, and the first edge is in contact with a structure (e.g., the bottom of a window opening in a building) that is at least partially holding up the IGU or LGU. If the second piece of carrier glass, which is offset from the first piece of carrier glass is not adequately supported, then a shear stress will develop between the two pieces of carrier glass due at least in part to the weight of the unsupported second piece of glass. Such a shear stress can lead to mechanical failures of the IGU or the LGU, in some cases. For example, in some embodiments, the EC devices within an IGU or LGU contain a relatively thick (e.g., greater than 10 micron) thick ion conductor layer, which has relatively weak mechanical properties (e.g., shear modulus less than 1 MPa, or less than 1 kPa) compared to the other materials in the IGU or LGU. When a shear stress is applied to such EC devices, the IC may deform and the EC device performance may degrade as a result. The present embodiments include various designs and structures that provide mechanical support for an offset piece of carrier glass (e.g., the second piece of carrier glass in the above embodiments) to reduce (or eliminate) the shear stress between two pieces of carrier glass in an IGU or LGU. The offset lengths between carrier glass pieces in the present IGUs and LGUs can be from 1 mm to 10 mm, or from 2 mm to 6 mm, or approximately 2 mm, or approximately 4 mm, or approximately 6 mm.

Figure 1:
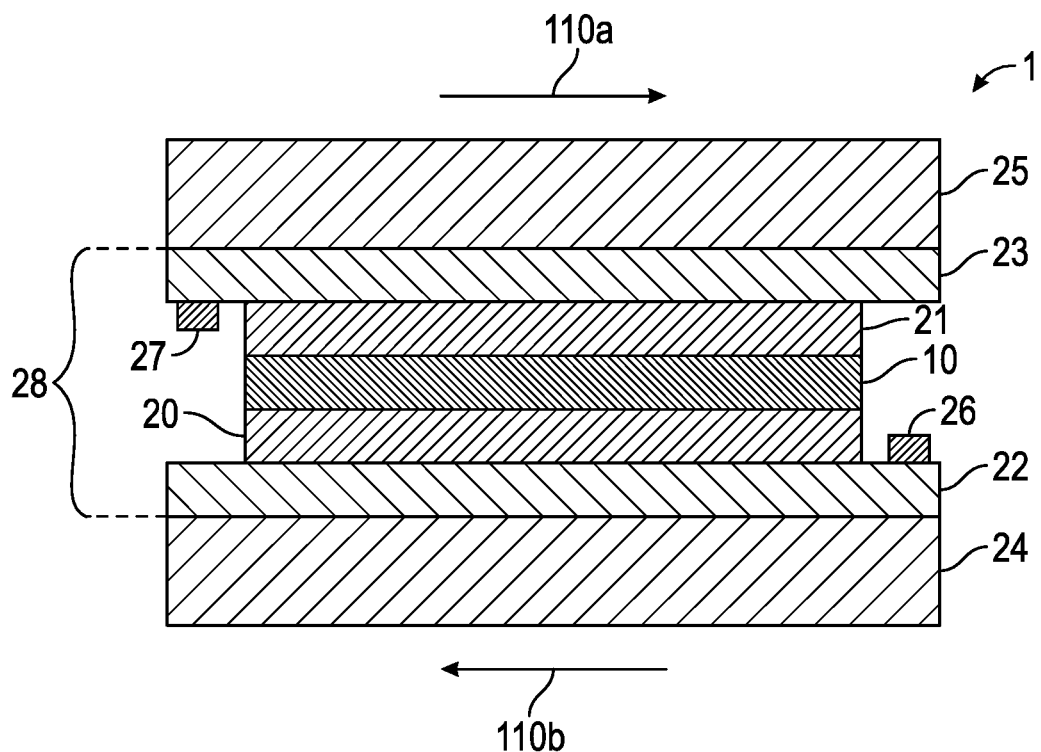
FIG. 1 a cross-sectional diagram of an electrochromic (EC) device, according to some embodiments.

FIG. 1 depicts a cross-sectional structural diagram of electrochromic device 1 according to an embodiment of the present disclosure. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 which, in turn, are arranged against "outer substrates" 24, 25. Elements 22, 20, 10, 21, and 23 are collectively referred to as an electrochromic stack 28. In some embodiments, substrate 24 can also be referred to as the lower substrate, and substrate 25 can be referred to as the upper substrate to aid in the further description of the invention. The terms upper and lower are not meant to be limiting and it is to be understood that the "outer substrates" 24 and 25 may have any orientation. As discussed above, the ion conductor 10 can have relatively weak mechanical properties (e.g., shear modulus less than 1 MPa, or less than 1 kPa) compared to the other layers in the EC device, in some embodiments. When a shear stress is applied to such EC devices (e.g., across substrates 24 and 25 along directions 110a and 110b), the IC may deform and the EC device performance may degrade as a result.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the electrochromic stack 28 may be changed by applying a voltage pulse to electrically conductive layers 22 and 23. The pulse causes electrons and ions to move between first and second electrode layers 20 and 21 and, as a result, electrochromic material in the first and/or second electrode layer(s) change(s) optical states, thereby switching electrochromic stack 28 from a more transmissive state to a less transmissive state, or from a less transmissive state to a more transmissive state. In one embodiment, electrochromic stack 28 is transparent before the voltage pulse and less transmissive (e.g., more reflective or colored) after the voltage pulse or vice versa.

Figure 2A:
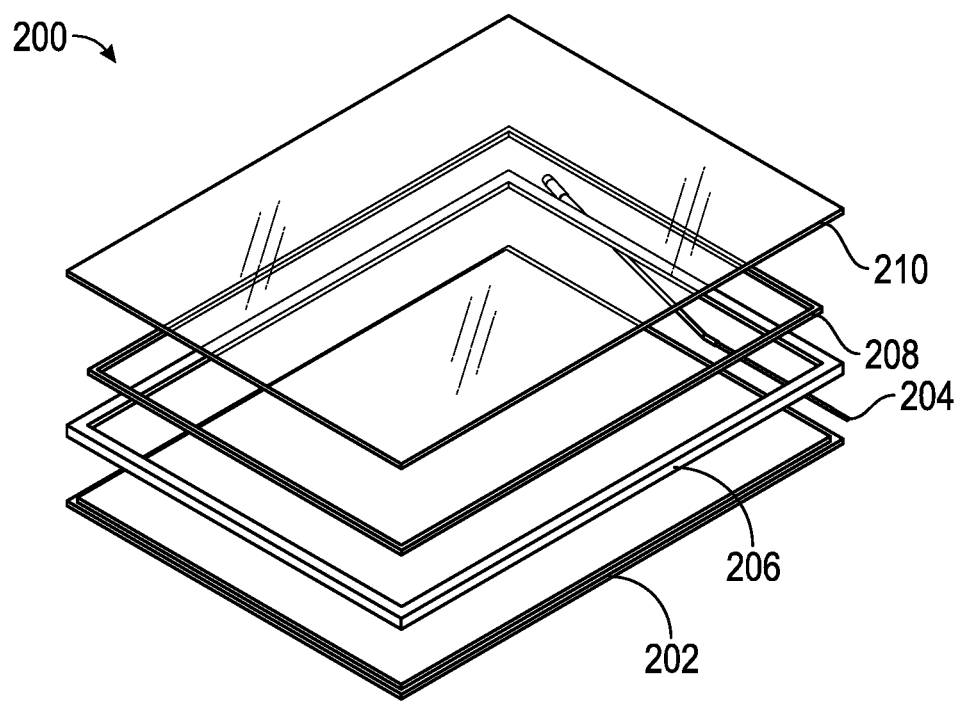
FIG. 2A shows an example of an integrated glazing unit (IGU) in an exploded view incorporating an EC lite, according to some embodiments.

FIG. 2A shows an example of an IGU 200 incorporating an EC lite 202 in an exploded view. The EC lite 202 can contain an EC device with two substrates (e.g., 24 and 25 of EC device 1 in FIG. 1). The two substrates may be glass or plastic. An example of the type of glass used can be AN glass which is an annealed non-alkali glass, often used for display glass. The glass substrates may be very thin in the range of 0.1 mm to 2 mm, or from 0.3 mm to 1.1 mm, or more particularly have a thickness of 0.5 mm, 0.4 mm, 0.3 mm, or thinner than 0.3 mm. In some embodiments, the substrates of the EC device are further laminated to two pieces of carrier glass (e.g., to improve the mechanical properties of the EC lite). The carrier glass may be strengthened glass such as annealed, heat strengthened or tempered glass. The carrier glass can be of any composition, such as soda lime glass, borosilicate glass, or any type of glass that provides improved mechanical properties to the EC lite. The carrier glass may be thicker than the substrates 24 and 25 used for the EC device and may have a thickness in the range of 2 mm to 10 mm, or more particularly have a thickness of 4 mm, 5 mm, 6 mm, or 8 mm. Because the carrier glass is significantly thicker than the EC device substrate glass it adds weight to the EC lite. In particular it can add to the weight of the EC lite placed in an integrated glass unit (IGU) and create shear stress. FIG. 2A also shows a cable harness 204, which is electrically coupled to the electrochromic device in the IGU 200 to provide electrical power (i.e., voltage and/or current). For example, the EC device can contain two bus bars (e.g., 26 and 27 in FIG. 1), and one or more circuit boards or flex circuits can be electrically coupled to the bus bars, and the cable harness 204 can be electrically coupled to one or more of the circuit boards or flex circuits. A spacer 208 is used to separate an interior lite 210 from the EC lite 202 to form a space between the interior lite 210 and the EC lite 202. A sealant (e.g., silicone) 206 can be used to seal the space between the interior lite 210 and the EC lite 202 (e.g., to hermetically seal the space and prevent moisture condensation in the space).

Figure 2B:
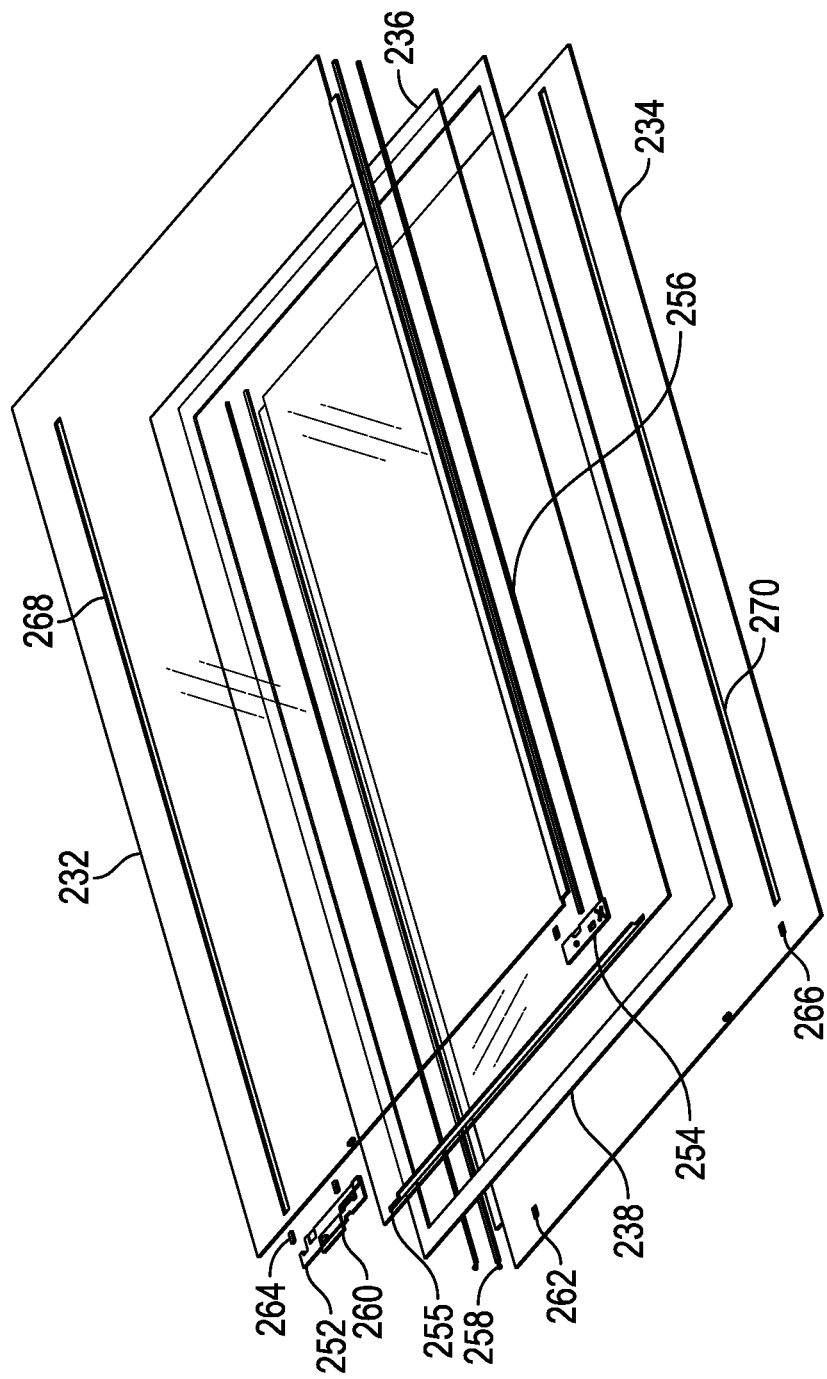
FIG. 2B shows an example of an EC device in an exploded view including electrical terminals and electrical connections, according to some embodiments.

FIG. 2B shows more details of an example of an EC device 230, including additional electrical terminals and electrical connections, in an exploded view. FIG. 2B shows an upper device substrate 232 and a lower device substrate 234, which in this example include electrically conductive layers and electrode layers (e.g., elements 20-23 in FIG. 1), and an IC layer 236 (e.g., element 10 in FIG. 1). A sealant 238 (e.g., polyisobutylene (PIB)) is also shown, which provides an environmental barrier for the edges of the EC device. In this example, a flex circuit 252 and a flex tab 254 are shown which are electrically coupled to the electrical terminals of the device. The flex circuit 252 and the flex tab 256 are also connected with a flex ribbon 255. The example shown in FIG. 2B includes several terminals, including upper and lower bus bars 256 and 258 (i.e., bus bar solders in this example), upper and lower V-sense tabs 260 and 262 (which are used to measure electrical properties of the EC device), and upper and lower sequestration tabs 264 and 266 (which are electrical terminals used to transfer charge from an EC material in the EC device to (or from) a sequestration material 268 and 270).

Further embodiments and details of IGU designs, electrical connections and materials are described in U.S. patent application Ser. No. 15/230,157, entitled "Electrochromic Device Assemblies", which is incorporated herein by reference for all purposes.

Figure 3A:
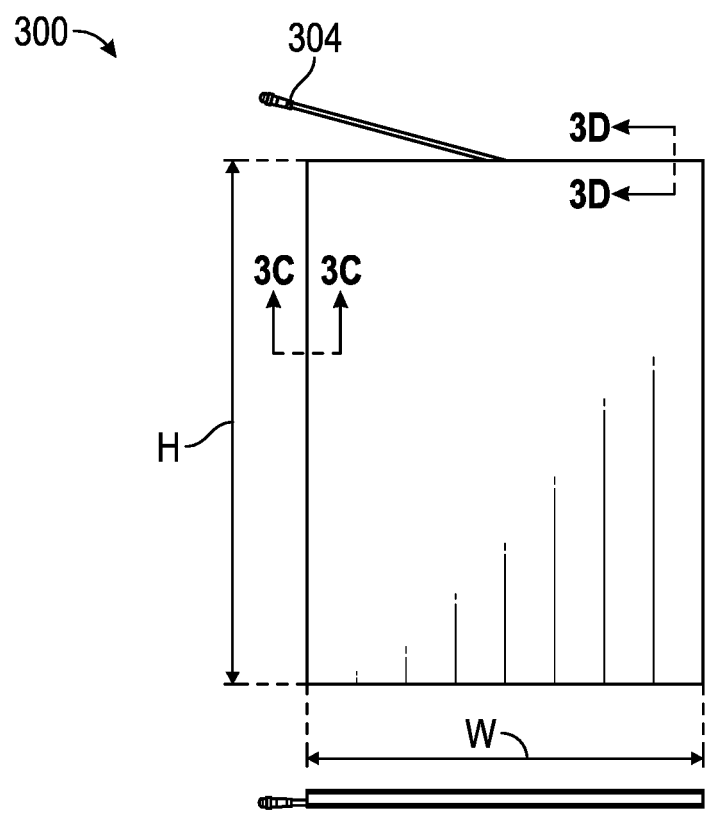
FIG. 3A shows a top-down view and a side view of an IGU, according to some embodiments.

FIG. 3A shows a top-down view and a side view of an IGU (e.g., element 200 in FIG. 2A), in accordance with some embodiments. In this example, the IGU 300 includes a region of sealant positioned to reduce the shear stress of the EC lite. The height and width of the IGU 300 are H and W in FIG. 3A, respectively. The IGU 300 may be a rectangle with dimensions 1508 mm×2931 mm, but this is not meant to be limiting. The present IGUs can have a shape other than a rectangle such as a trapezoid or triangle, or be a rectangle of many other dimensions. FIG. 3A also shows a cable harness 304, which is a cable that is electrically connected to the electrochromic device as described herein. In some cases, the cable harness can be terminated on one end with a connector that is electrically connected to a circuit board (or flex circuit) within the EC device of the IGU. The cable harness 304 can connect the circuit board to a controller assembly, driver and/or power supply to control and provide power to the electrochromic device. FIG. 3A shows cut-lines 3C-3C and 3D-3D, which will be referred to in subsequent figures.

Figure 3B:
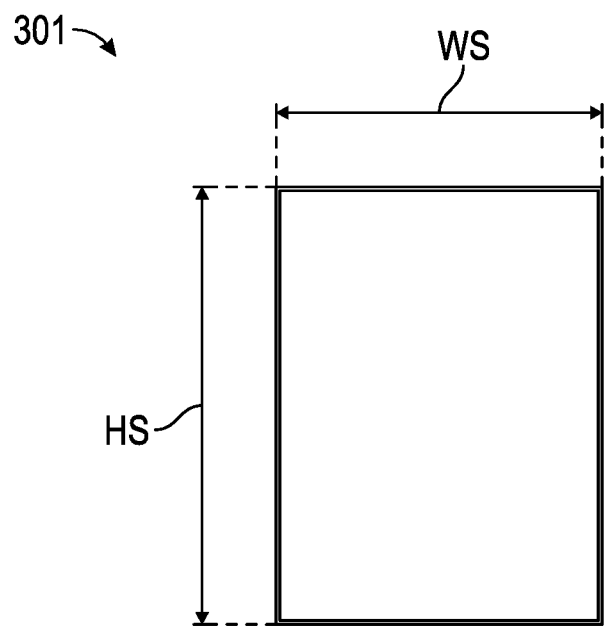
FIG. 3B shows a top-down view of a spacer within an IGU, according to some embodiments.

FIG. 3B shows a top-down view of the spacer 301 (e.g., 208 in FIG. 2A) within the IGU 300. The dimensions of spacer 301 WS (width spacer) and HS (height spacer) are smaller than the IGU 300 dimensions for width (W) and height (H) in FIG. 3A. In one embodiment described below with respect to FIG. 3C, the dimensions of spacer 301 are smaller than the IGU 300 dimensions W and H by amounts PD (327) and SD (328). In this example, the outside dimension of the width of the spacer WS (330) follows the relationship WS=−W2PD−2SD. The outside dimension of the height of the spacer HS in this example depends on the size of SD. If SD is less than 8 mm, then HS=H−2PD−SD−8 mm. If SD is greater than 8 mm, then HS=−H2PD−2SD. WS, HS, PD and SD are described further below and in FIG. 3C.

Figure 3C:
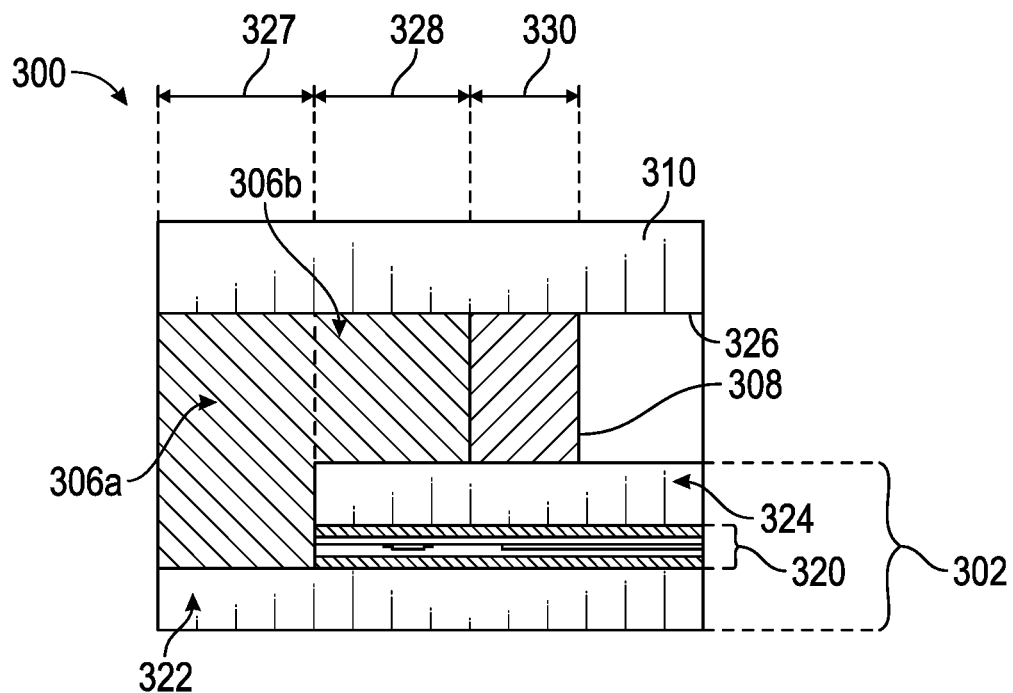
FIGS. 3C and 3D show cross-sections along different cut-lines shown in FIG. 3A of an electrochromic device integrated glazing unit (IGU) with carrier glass, according to some embodiments.
Figure 3D:
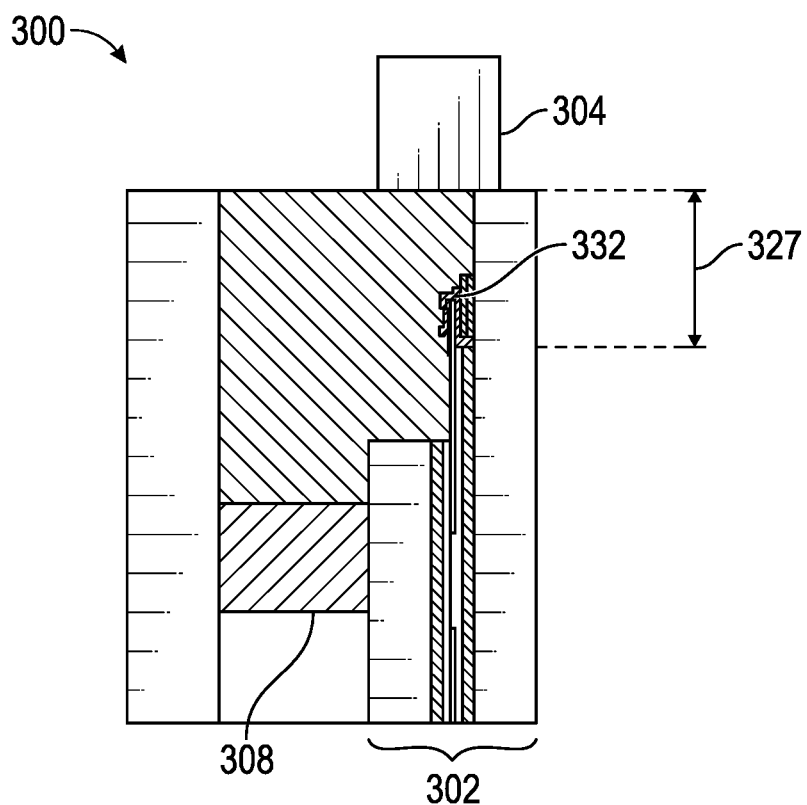

FIGS. 3C and 3D show cross-sections along different cut-lines of an embodiment of an electrochromic device integrated glazing unit (IGU) with carrier glass. The dimensions of the IGU (and components thereof, in some cases, e.g., those shown in FIGS. 3C and 3D) can change without impacting the concepts in this disclosure. This embodiment shows an EC lite 302, which contains an EC device 320 attached (e.g., laminated) to two pieces of carrier glass 322 and 324. The width PD 327 by which the spacer is smaller than the IGU in that dimension is also shown in this view. The EC device in the embodiment shown in FIGS. 3C and 3D may be similar to or the same as the EC device shown in FIG. 1. In some embodiments, one or more EC devices are laminated together and laminated to one or more pieces of carrier glass to form an EC lite. The embodiment shown in FIGS. 3A-3D show one EC device 320 laminated to the carrier glass pieces 322 and 324. However, in other embodiments, EC lite 322 can be made up of two EC devices laminated together, which are in turn laminated between the carrier glass pieces 322 and 324. In another embodiment, the electrochromic device 320 could be laminated to one piece of carrier glass 322 in an IGU, and the other piece of carrier glass 324 can be omitted. In another embodiment, the electrochromic device 320 could be laminated to one piece of carrier glass 324 in an IGU, and the other piece of carrier glass 322 can be omitted. In this example, the first and second pieces of carrier glass 322 and 324 are offset such that the first piece of carrier glass 322 extends farther than both the second piece of carrier glass 324 and the EC device 320 along a first edge of the electrochromic lite 302.

FIG. 3C shows a cross-section along the cut-line 3C-3C in FIG. 3A of an embodiment of an EC lite 302 incorporated into an IGU 300. In this embodiment, the electrochromic device is laminated to two pieces of carrier glass 322 and 324. In some embodiments, the EC device 320 is laminated to the carrier glass pieces 322 and 324 with polyvinyl butyral (PVB) layers. In other embodiments, different materials can be used to laminate the EC device 320 to the carrier glass pieces 322 and 324, such as ethylene vinyl acetate (EVA),) layer, polyurethane (PU), an ultraviolet activated adhesive, or other transparent or translucent bonding material.

In the embodiment shown in FIG. 3C, the EC device 320 and carrier glass pieces 322 and 324 are incorporated in the IGU with a spacer 308 and sealants 306a and 306b. The spacer width WS is also shown in the figure. The spacer 308 separates the EC lite 302 from the interior lite 310, and the sealants 306a and 306b serve to connect the EC lite 302 to the interior lite 310. Also shown is a low-e coating 326, which may be present on a side of the interior lite 310. A thermally insulating space is thereby created in between the EC lite 302 and the interior lite 310. The sealant 306a bonds the first piece of carrier glass 322 to the interior glass lite 310 in an outermost first region (with width PD 327) along an edge of the IGU 300. The sealant 306b bonds the second piece of carrier glass 324 to the interior glass lite 310 in a second region (with width SD 328) interior to the outermost first region along the edge of the IGU 300. Advantageously, the sealant 306b in the second region secures the second piece of carrier glass 324 to the glass lite 310. This reduces the shear stress between the first and second pieces of carrier glass 322 and 324, when the EC IGU 300 is oriented vertically and the first edge of the electrochromic IGU is oriented down, compared to a structure without the sealant 306b bond between the second piece of carrier glass 324 and the glass lite 310 in the second region. The sealants 306a and 306b in this example is silicone although the sealant may be any sealant material with low water permeability. In some embodiments, the sealants 306a and 306b are the same material, and in other embodiments the sealants 306a and 306b are two different materials. The sealants 306a and 306b can be applied together in one process step, or in two separate process steps. The sealant or sealants are selected to provide enough mechanical strength to reduce any shear stress between the first and second pieces of carrier glass. Some non-limiting examples of the sealant 306a and/or the sealant 306b in the present IGUs are polyisobutylene (PIB), polysulfide (PS), polyurethane (PU), silicone, hot melt butyl (HMB), reactive HMB dual seal equivalent, and combinations thereof. The function of the sealant 306b in the second region is to reduce the impact of the shear stresses on the IGU, and therefore requires sufficient mechanical properties (e.g., shear modulus, and shear strength). Some of the sealants in the previous list therefore may not be suitable for the sealant 306b in some embodiments (e.g., when the carrier glass sheets are too heavy).

FIG. 3D shows a cross-section of the same embodiment of an electrochromic lite 302 incorporated into IGU 300, but along the cut-line 3D-3D as previously shown in FIG. 3A. FIG. 3D also shows a flex circuit cable connection 332, where the cable harness can be connected to the flex circuit (or circuit board) to make electrical connection to the electrochromic device 320.

The embodiment shown in FIGS. 3A-3D have a number of layers, summarized below. The first carrier glass 322 is attached to the EC lite 302 by a first layer of laminant material (e.g., PVB) (not shown in FIGS. 3A-3D). The EC lite 322 is attached to the second carrier glass 324 by a second layer of laminant material (e.g., PVB) (not shown in FIGS. 3A-3D). The first carrier glass 322, EC lite 302, second carrier glass 324 assembly is attached to the glass lite 310 of the IGU 300 by a spacer 308 and a sealant 306a-b (e.g., a silicone secondary sealant). In other embodiments, the layers of laminant material and sealant can be other materials used to laminate or attach the layers to one another, or seal the IGU 300. The EC device 320 within the EC lite 302 also has a number of layers, as described herein (e.g., a first substrate, a first transparent conductive layer on the first substrate, a first bus bar making electrical contact to the first transparent conductive layer, a second substrate, a second transparent conductive layer on the second substrate, a second bus bar making electrical contact to the second transparent conductive layer, and at least one layer of electrochromic material). In some embodiments, there is a first electrochromic material applied to the first transparent conductive layer on the first substrate, a second electrochromic material applied to the second transparent conductive layer on the second substrate, and an ion conducting layer between the electrochromic materials. In some embodiments, the ion conducting layer is used to laminate the first substrate, transparent conducting layer and electrochromic material to the second substrate, transparent conducting layer and electrochromic material to form the EC device 320. In some embodiments of the EC device, a portion of a first edge of the second substrate is recessed relative to at least a portion of a first edge of the first substrate, exposing at least a portion of the first bus bar for electrical connection. The circuit board or flex circuit (not shown in FIGS. 3A-3D) is used to make connection to the first and second bus bars of the EC device 320. In some embodiments, the circuit board or flex circuit is also used to make electrical connection to other terminals (e.g., sense voltage and sequestration terminals) of the EC device 320 within the EC lite 302. The substrates can be either glass or plastic, in different embodiments.

In the embodiment shown in FIGS. 3A-3D, the carrier glass 324 that is attached to the glass lite 310 with the spacer 308 and the sealant 306a-b and the glass lite are offset from each other in one lateral direction. This enables the sealant 306a-b to contact more surfaces than the surface of the carrier glass 322. In the embodiment shown in FIG. 3C, the sealant 306a-b contacts at least one surface of the carrier glass 322, the surface of carrier glass 324, and the glass lite 310. The sealant also contacts the flex circuit, and serves the purpose of protecting the flex circuit (or circuit boar) from the environment.

In any of the electrochromic device assemblies in this disclosure (i.e., EC devices within EC lites, IGUs or LGUs), the EC device 320 can be laminated to one or more pieces of carrier glass (such as 322 and 324), and the one or more pieces of carrier glass can be patterned with ceramic frit. The ceramic frit can be applied using a screen printing process, and then fired within a furnace to fuse the ceramic frit coating to the glass. The ceramic frit can be colored. The ceramic frit can be applied in a regular or irregular pattern, or applied around the border of the electrochromic device assembly. In some embodiments, the ceramic frit is used to visually obscure the electrical connections, circuit board and/or controller assembly at the edge of the assembly. The furnace used to fire the ceramic frit can be a tempering furnace. The temperature of the firing process can be greater than 400° C., or greater than 450° C., or greater than 500° C., or greater than 550° C., or greater than 600° C., or greater than 650° C., or greater than 700° C., or from 600° C. to 800° C., or from 500° C. to 800° C., or from 600° C. to 800° C., or from 400° C. to 900° C., or from 500° C. to 900° C., or from 600° C. to 900° C. In some cases, the ceramic frit firing process reaches a sufficient temperature (e.g., greater than 600° C.), and a rapid cooling rate is used, and the carrier glass is annealed, heat strengthened, or tempered in the process.

In some embodiments, one or more EC devices are laminated together and laminated to one or more pieces of carrier glass to form the EC lite 302, and this entire laminated assembly is symmetric along the direction perpendicular to the main body of the laminated assembly. In some embodiments, a symmetric laminated assembly is advantageous because it may reduce or eliminate bowing during lamination. Not to be limited by theory, bowing may occur when there are materials with different coefficients of thermal expansion in an asymmetric assembly such that the expansion and contraction of one side of the assembly is different from the opposing side of the assembly leading to residual stress and bowing.

In some embodiments, the carrier glass can be laminated to the electrochromic device, and can provide increased strength. In some embodiments, the substrate used as the substrate for the electrochromic device can be a type of glass that lacks the strength necessary for certain applications, and laminating or otherwise attaching the electrochromic device to one or more pieces of stronger carrier glass can increase the strength of the assembly and enable the electrochromic device to be used in various applications (e.g., windows in buildings or interior partitions). In such cases, one or both substrates of the electrochromic device could be laminated to annealed, strengthened, or tempered carrier glass to increase the strength of the electrochromic device and carrier glass laminate. In some embodiments, one or both electrochromic device substrates are laminated to carrier glass and one or both electrochromic device substrates have a greater than 90% probability of withstanding a thermal stress or withstand a thermal edge stress less than 100 MPa, or less than 80 MPa, or less than 60 MPa, or less than 50 MPa, or less than 40 MPa, or less than 35 MPa, or less than 30 MPa, or less than 25 MPa, or less than 20 MPa, or less than 15 MPa, or less than 10 MPa, or from 5 to 100 MPa, or from 5 to 80 MPa, or from 5 to 60 MPa, or from 5 to 50 MPa, or from 5 to 40 MPa, or from 5 to 30 MPa, or from 5 to 25 MPa, or from 5 to 20 MPa, or from 5 to 15 MPa.

In some embodiments, the carrier glass enables the use of various materials and manufacturing methods for producing the electrochromic device. For example, the glass for the substrate of the electrochromic device could not be heat strengthened or tempered, and therefore lack the strength (or edge strength) necessary for use in some applications. Alternatively, the electrochromic device could be on a non-glass flexible substrate such as a polymer or plastic. In some embodiments, one or both electrochromic device substrates are soda lime glass. In some embodiments, one or both electrochromic device substrates are glass with sodium oxide (e.g., $Na_2O$) mole fraction less than 0.1%, or less than 1%, or less than 5%, or less than 10%, or from 0.0001% to 1%, or from 0.0001% to 5%, or from 0.0001% to 10%. In some embodiments one or both of the electrochromic device substrates are annealed glass with sodium oxide (e.g., $Na_2O$) mole fraction less than 0.1%, or less than 1%, or less than 5%, or less than 10%, or from 0.0001% to 1%, or from 0.0001% to 5%, or from 0.0001% to 10%. In some embodiments one or both of the electrochromic device substrates are glass with a boron oxide (e.g., $B_2O_3$) mole fraction greater than 0.1%, or greater than 1%, or greater than 5%, or from 0.1% to 20%, or from 0.1% to 15%, or from 0.1% to 10%. In some embodiments, one or both electrochromic device substrates are annealed glass with boron oxide (e.g., $B_2O_3$) mole fraction greater than 0.1%, or greater than 1%, or greater than 5%, or from 0.1% to 20%, or from 0.1% to 15%, or from 0.1% to 10%. In some embodiments, one or both electrochromic device substrates are glass or strengthened glass (such as annealed or tempered) with a coefficient of thermal expansion (between about 20° C. and 300° C.) less than 8 ppm/K, or less than 7 ppm/K, or less than 6 ppm/K, or less than 5 ppm/K, or less than 4 ppm/K, or from 2 to 8 ppm/K, or from 2 to 7 ppm/K, or from 2 to 6 ppm/KL, or from 3 to 6 ppm/K. In some embodiments, one or both electrochromic device substrates are thinner than 4 mm, or thinner than 3 mm, or thinner than 2 mm, or thinner than 1.5 mm, or thinner than 1.25 mm, or thinner than 1 mm, or thinner than 0.8 mm, or thinner than 0.6 mm, or from 0.3 mm to 4 mm, or from 0.3 mm to 3 mm, or from 0.3 mm to 2 mm, or from 0.3 mm to 1.5 mm, or from 0.3 mm to 1 mm, or from 0.5 mm to 4 mm, or from 0.5 mm to 3 mm, or from 0.5 mm to 2 mm, or from 0.5 mm to 1.5 mm, or from 0.5 mm to 1 mm. In one particular embodiment, the substrates used for the electrochromic device may be a low CTE (coefficient of thermal expansion) borosilicate glass having a density of approximately 2.2 g/cu-cm and has a thickness of less than about 1.0 mm, and may have a thickness of less than about 0.5 mm.

One or both substrates of the electrochromic device could be laminated to thicker annealed, strengthened, or tempered carrier glass to increase the strength of the electrochromic device and carrier glass laminate. The thickness of the carrier glass may be greater than 1.0 mm, or within a range of about 0.5 mm to 10 mm. For most residential applications the thickness of the carrier glass may be approximately 3.0 mm and for most commercial applications the thickness of the carrier glass may be approximately 6.0 mm.

Figure 4A:
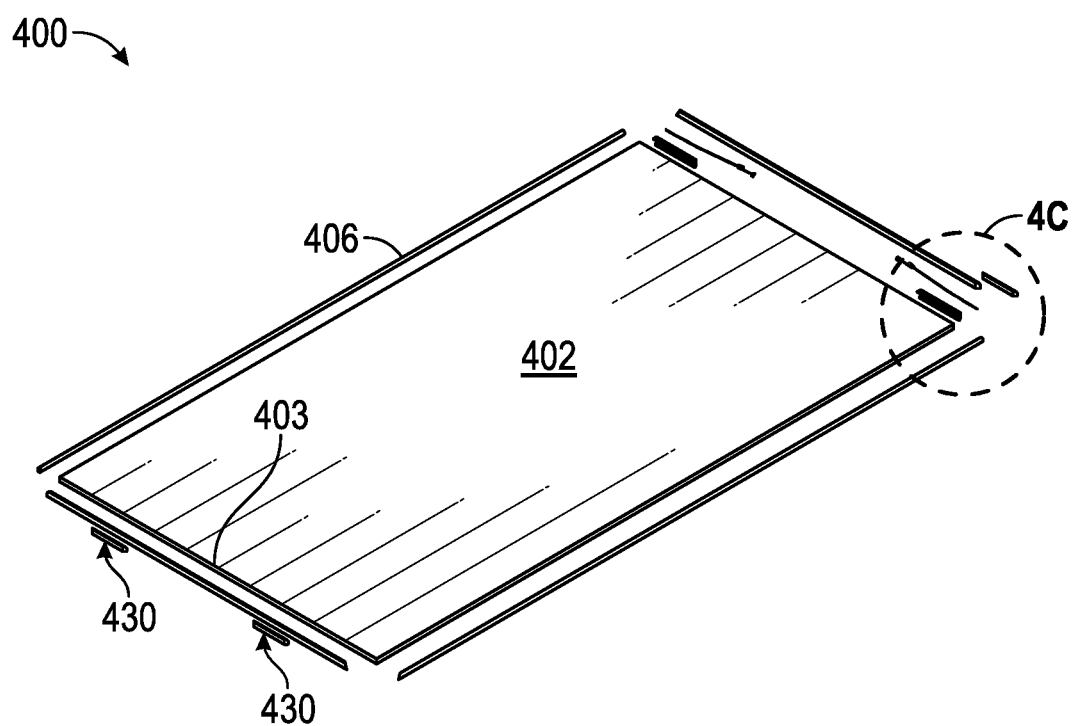
FIG. 4A shows an example of a laminated glass unit (LGU) in an exploded view incorporating an EC lite and other components including silicone sealant and shear blocks, according to some embodiments.

FIG. 4A shows an example of a laminated glass unit (LGU) 400 incorporating an EC lite 402, and other components including silicone sealant 406 and shear blocks 430, in an exploded view. FIG. 4A also designates region 4C, which will be referred to in subsequent figures. The shear blocks 430 in this example are installed at quarter points of the support edge 403. In embodiments where the LGU is installed as a window, the shear blocks 430 are aligned with window support block locations in the installed window. In other embodiments, the LGU is supported at locations other than the quarter points, and the shear blocks are aligned with those support locations. In some embodiments, the LGU is supported by one or more shear blocks, where the one or more shear blocks are located at one or more points along the support edge. The shear blocks 430 in the example shown in FIG. 4A have lengths that are approximately 10% of the length of the first edge. In other embodiments, the shear blocks can be longer or shorter than those shown in this example, and can be from 5% to 100% (and in some cases less than 5%) of the length of the first edge of the LGU. In embodiments where there are two or more shear blocks in an LGU, the shear blocks can all be the same length or can be different lengths from each other. The LGU in the example in FIG. 4A is rectangular, with the support edge along a shorter edge of the LGU. In other embodiments, the support edge is along the longer edge of an LGU, and the shear blocks 430 can be installed along the longer edge of the LGU. The support edge is typically determined by the design of the building or window façade/wall and can be designated during the design phase or at installation of the LGU (e.g., when the LGU is placed into a window frame in an interior partition in a building). The EC lite 402 can contain an EC device with two substrates (e.g., 24 and 25 of EC device 1 in FIG. 1). In some embodiments, the substrates of the EC device are further laminated to two pieces of carrier glass (e.g., to improve the mechanical properties of the EC lite). The sealant in this example is silicone although the sealant may be any sealant material with low water permeability. Some non-limiting examples of sealants in the present LGUs are polyisobutylene (PIB), polysulfide (PS), polyurethane (PU), silicone, hot melt butyl (HMB), reactive HMB dual seal equivalent, and combinations thereof.

Figure 4B:
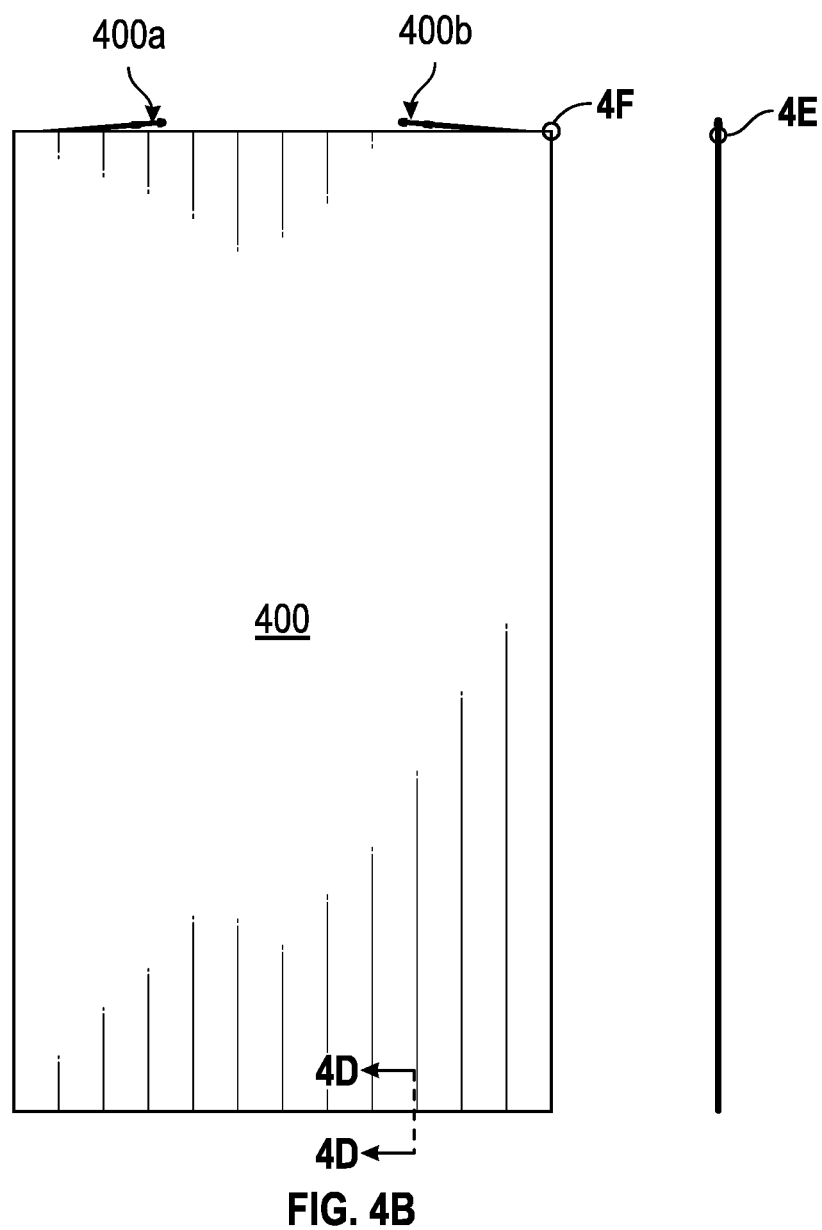
FIG. 4B shows an example LGU in top-down and side views having two layered EC devices with two cable harnesses, according to some embodiments.

FIG. 4B shows top-down and side views of an example of an embodiment of an LGU 400 having two layered EC devices with two cable harnesses 404a and 404b, which are electrically coupled to the two electrochromic devices making up the EC lite 402 in the IGU 400. In an alternate embodiment the LGU may have an EC lite having one EC device. FIG. 4B also shows a side view of the LGU in an embodiment. FIG. 4B also designates cut-line 4D-4D, and regions 4E and 4F, which will be referred to in subsequent figures. In this embodiment, the LGU is a rectangle with dimensions 1508 mm×2931 mm, but this is not meant to be limiting. The present LGUs can have a shape other than a rectangle, or be a rectangle of many other dimensions. The cable harnesses provide electrical power (i.e., voltage and/or current) to the EC lite. For example, the cable harnesses 404a and 404b can connect the circuit board (or flex circuit) to a controller assembly, driver and/or power supply to control and provide power to the electrochromic device. For example, each of the EC devices within the EC lite 402 can contain two bus bars (e.g., 26 and 27 in FIG. 1), and one or more circuit boards or flex circuits can be electrically coupled to the bus bars, and the cable harness 404a (or 404b) can be electrically coupled to one or more of the circuit boards or flex circuits. In an alternate embodiment where the two EC devices are electrically connected in series there may be only one cable harness. In the example shown in FIGS. 4A-4F, there are two EC devices within the EC lite 402. In other examples, there can be only one EC device within the EC lite 402, and only one cable harness (either 404a or 404b) connected to the one EC device.

Further embodiments and details of LGU designs, electrical connections and materials are described in U.S. patent application Ser. No. 15/230,157, entitled "Electrochromic Device Assemblies", which is incorporated herein by reference for all purposes.

Figure 4C:
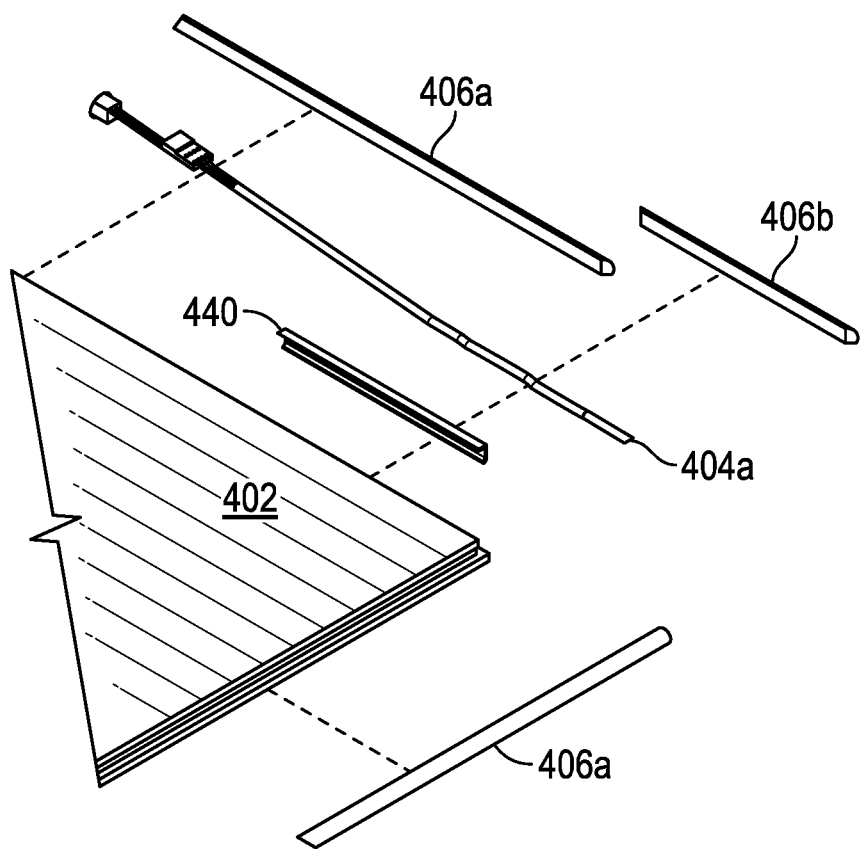
FIG. 4C shows the detail of region 4C in FIG. 4A in an exploded view of an EC lite incorporated into an LGU, according to some embodiments.

FIG. 4C shows the detail of region 4C in FIG. 4A of an embodiment of an EC lite 402 incorporated into an LGU 400, in an exploded view. The cable harness 404a is connected to EC lite 402, and strain relief cover) 440 is positioned over a cable connection of the cable harness 404a. The strain relief cover 440 and the sealant 406b form a mechanically strong bond between the cable harness 404a and the EC lite 402, which prevents the electrical connection between the EC devices in the EC lite 402 and the cable harness 404a from damage (e.g., if the cable harness is pulled on during installation). The strain relief cover 440 forms a cavity around portions of the cable harness 404a

(e.g., the connector between the cable harness and the flex circuit or circuit board of the EC device) into which a sealant 406b (e.g., silicone) is disposed. The sealant 406b bonds with portions of the cable harness 404a and portions of the EC lite 402 (e.g., the EC device flex circuit or circuit board), which advantageously strengthens the mechanical coupling between the cable harness 404a and the EC lite 402. In some embodiments, there is one EC device within the EC lite 402, or there are two EC devices connected in series and the LGU 400 has one cable harness (e.g., 404a) and one strain relief cover 440. In other embodiments, there are two EC devices within the EC lite 402, and the LGU 400 has two cable harness (e.g., 404a-b) and two strain relief covers (as depicted in FIG. 4A). Sealant 406a seals the edges of the LGU 400, as described below.

Figure 4D:
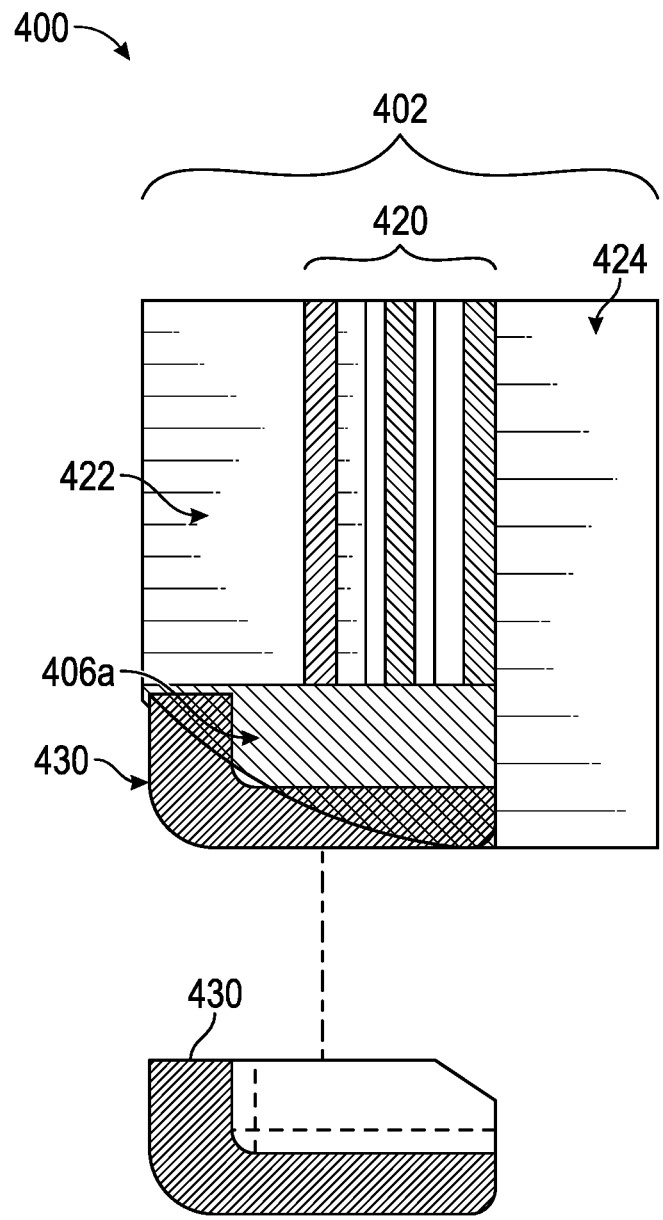
FIG. 4D shows a cross-section along cut-line 4D-4D in FIG. 4B in a side view of an EC lite incorporated into an LGU, according to some embodiments.

FIG. 4D shows a cross-section along cut-line 4D-4D in FIG. 4B of an embodiment of an EC lite 402 incorporated into an LGU 400. In this example, EC lite 402 contains EC device 420, a first piece of carrier glass 422 and a second piece of carrier glass 424. In some embodiments, EC lite 402 contains one EC device 420 laminated between carrier glass pieces 422 and 424 (as shown in FIG. 4D), or two EC devices 420 laminated together, which are laminated between carrier glass pieces 422 and 424. Carrier glass piece 424 extends farther than carrier glass piece 422 along the edge of the LGU 400 containing cut-line 4D-4D, which is the support edge in this example. In this example, the shear blocks 430 are L-shaped, wherein the short leg of the "L" supports carrier glass piece 422 when the LGU 400 is oriented vertically and the support edge of the LGU is oriented down, which reduces the shear stress between the first and second pieces of carrier glass 422 and 424 compared to a structure without shear blocks disposed at the edge of the electrochromic LGU. In some embodiments, the shear block supports both pieces of carrier glass 422 and 424, for example, by extending underneath the carrier glass piece 424 in FIG. 4D. In other embodiments, the shear blocks can be shapes other than L-shapes, such as rectangular prisms, or more complex shapes. Since the function of the shear block is to support the recessed (due to the offset) carrier glass sheet when the LGU is supported by (or standing on) the support edge, in some embodiments, the shear blocks have heights approximately equal to, or slightly less than, the offset distance between the carrier glass sheets. In the example in FIG. 4D the offset between the carrier glass pieces 422 and 424 is approximately 4.0 mm, and the shear block shown is approximately 3.8 mm high in that dimension. In some cases, the shear block is slightly smaller than the offset distance to account for sealant that may be between the shear block and the carrier glass sheet (e.g., 422 in FIG. 4D). In some embodiments, the shear blocks have high surface area to strengthen the bond between the shear block and the sealant holding the shear block in place in the LGU.

In an embodiment, a method for assembling the shear blocks includes applying a sealant (e.g., silicone) bead across the support edge, and conforming the sealant into place using a wiper tool. Subsequently, the shear block 430 is pressed into the sealant until the edges of the shear block fully contact the first and second pieces of carrier glass 422 and 424. The shear block 430 is positioned such that the outer shear block surfaces are approximately flush with the glass surfaces, in some embodiments.

Figure 4E:
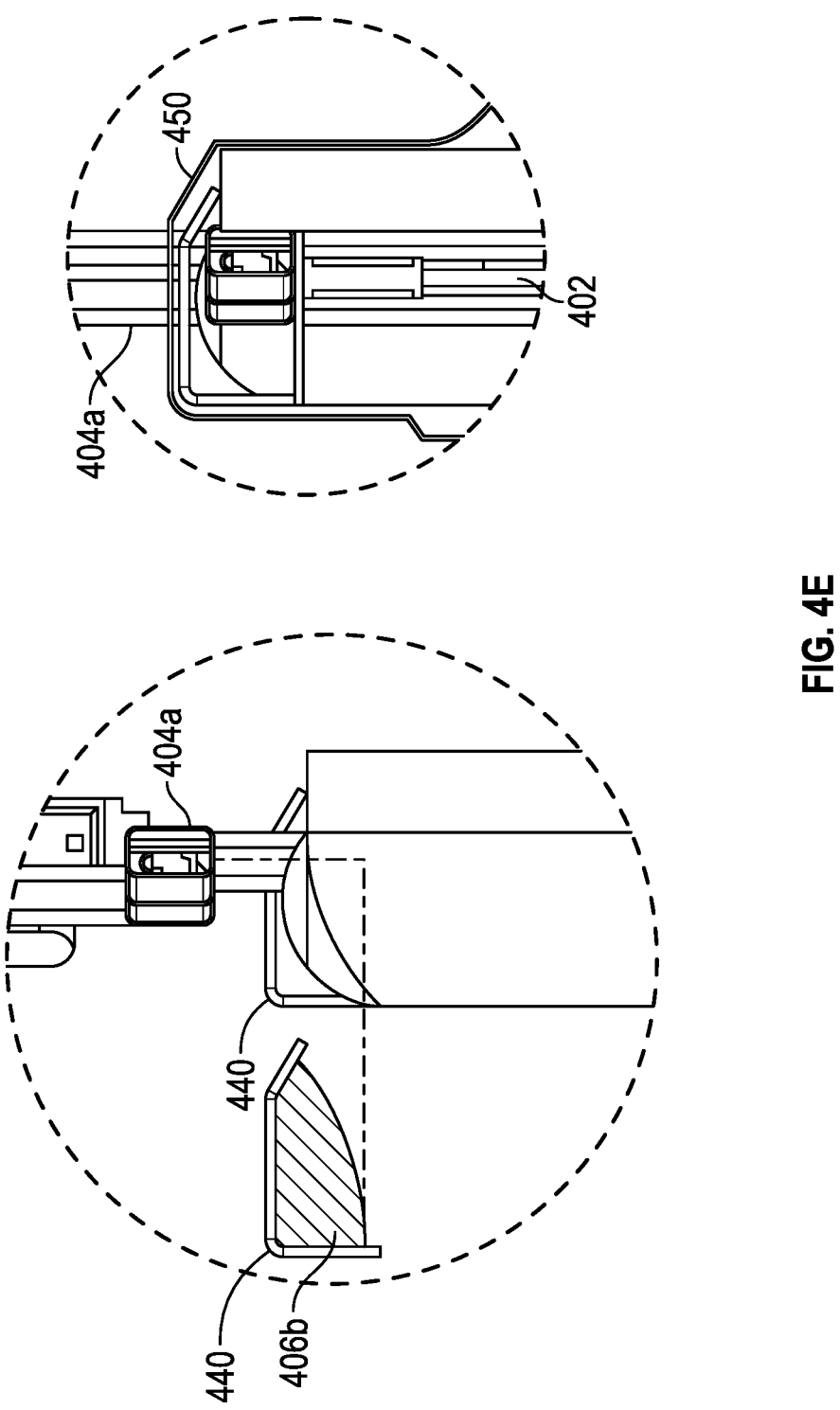
FIG. 4E shows the detail of region 4E in FIG. 4B in a side view of an EC lite incorporated into an LGU, according to some embodiments.

FIG. 4E shows the detail of region 4E in FIG. 4B of an embodiment of an EC lite 402 incorporated into an LGU 400. FIG. 4E shows cable harness 404a connected to EC device 402, and the strain relief cover 440 covering portions of the cable harness 404a. Sealant 406b (e.g., silicone) is shown filling the strain relief cover 440. The strain relief cover 440 and the sealant 406b form a mechanically strong bond between the cable harness and the EC lite 402.

In some embodiments, a method for assembling the strain relief cover includes electrically connecting the cable harness to the flex circuit or the circuit board of the EC device 420 within EC lite 402. In some embodiments, the cable harness includes a printed circuit assembly (PCA), which includes a zero-insertion force (ZIF) connector. In such cases, the ZIF connector of the cable PCA can be installed on a tab of the flex circuit or circuit board of the EC device 420, and the locking tab of the ZIF connector can be rotated down and locked into place. The strain relief cover 440 can then be filled with a sealant 406b (e.g., silicone), and then pressed into place over a portion of the cable harness 440. In some embodiments, tape 450 can be applied across the strain relief cover and portions of the EC lite (as shown in FIG. 4E) during sealant 406b curing.

Figure 4F:
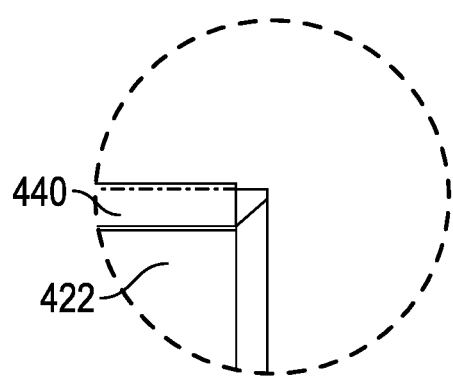
FIG. 4F shows the detail of region 4F in FIG. 4B in a side view of an EC lite incorporated into an LGU, according to some embodiments.

FIG. 4F shows the detail of region 4F in FIG. 4B of an embodiment of an EC lite 402 incorporated into an LGU 400. FIG. 4F shows the strain relief cover 440 aligned with the edge of the upper carrier glass 422.

Figure 5:
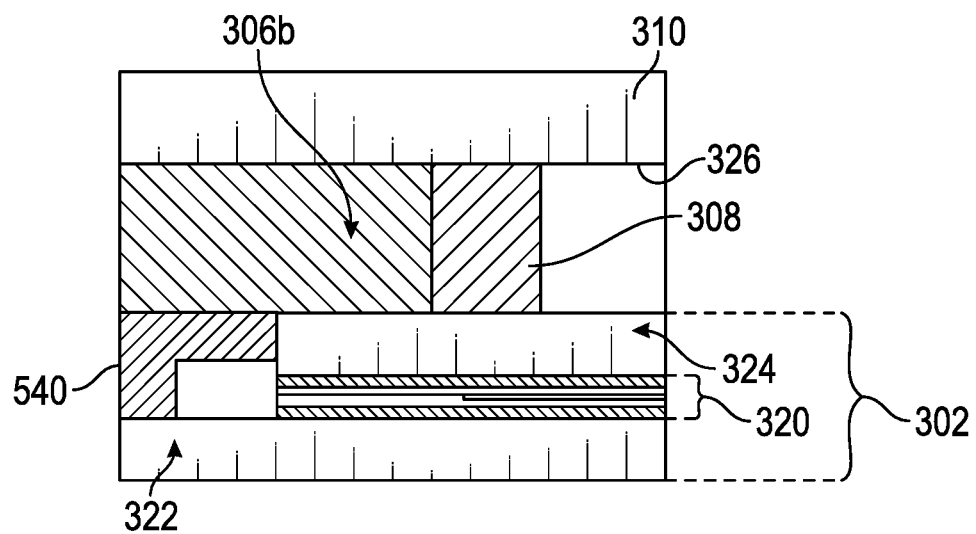
FIG. 5 shows an example cross-section of an IGU in a side view including additional an L-shaped shear block, according to some embodiments.

In some embodiments, shear blocks similar to those shown for LGU 400 can be used in IGUs to support one piece of carrier glass which is offset from the other piece of carrier glass. For example, the IGU 300 shown in FIG. 5 includes the same components as shown in the IGU example in FIG. 3C. In the IGU in FIG. 5, however, an additional L-shaped shear block 540 is installed on IGU 300 (e.g., using sealant as described for the LGU embodiments). The additional L-shaped shear block 540 is installed on IGU 300 such that one leg of the "L" supports carrier glass piece 324 when the IGU 300 is oriented vertically and the support edge of the IGU is oriented down, which reduces the shear stress between the first and second pieces of carrier glass 322 and 324 compared to a structure without shear blocks disposed at the edge of the electrochromic IGU. Therefore, the IGU in FIG. 5 includes two designs to reduce the shear stress between the carrier glass pieces 322 and 324, 1) sealant between carrier glass piece 324 and glass lite 310, and 2) a shear block 540 to support carrier glass piece 324. The shapes, dimensions and position of the shear blocks describe above regarding LGUs can also apply to shear blocks in IGUs, in some embodiments.

Additional Considerations

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An electrochromic laminated glass unit (LGU), comprising:
   a first substrate laminated to a first piece of carrier glass;
   a second substrate laminated to a second piece of carrier glass;
   a first electrochromic material disposed between the first and the second substrates; and
   one or more shear blocks;
   wherein:
      the first and second pieces of carrier glass are offset such that the first piece of
   carrier glass extends farther than the second piece of carrier glass in at least one dimension;
      the first piece of carrier glass extends farther than the first substrate, the second substrate and the electrochromic device in the at least one dimension;
      the one or more shear blocks are disposed at a first edge of the electrochromic
   LGU, adjacent to both the first and second pieces of carrier glass, at the edge where the
   first and second pieces of carrier glass are offset; and
      the second piece of carrier glass is supported by the shear blocks when the electrochromic LGU is oriented vertically and is resting on the first edge of the electrochromic LGU,
      wherein the shear blocks are affixed to the first and second pieces of carrier glass with sealant.

2. The electrochromic LGU of claim 1, wherein the sealant is selected from the group consisting of polyisobutylene (PIB), polysulfide (PS), polyurethane (PU), silicone, hot melt butyl (HMB), reactive HMB dual seal equivalent, and combinations thereof.

3. The electrochromic LGU of claim 1, wherein the shear blocks are L-shaped with the thicker part of the L-shape adjacent to the second piece of carrier glass and the thinner part of the L-shape adjacent to the first piece of carrier glass.

4. The electrochromic LGU of claim 1, wherein the first or second piece of carrier glass comprise strengthened soda lime glass having a thickness in the approximate range from about 3.0 mm to about 6.0 mm.

5. The electrochromic LGU of claim 1, wherein the offset between the first and second pieces of carrier glass is from 2 mm to 6 mm.

6. The electrochromic LGU of claim 1, wherein the first and second substrates are glass or plastic.

7. The electrochromic LGU of claim 1, wherein the first and second substrates comprise:
   borosilicate glass with a coefficient of thermal expansion about 2.2 g/cu-cm;
   a thickness from 0.25 mm to 1 mm; and
   a greater than 90% probability of withstanding a thermal stress or withstand a thermal
   edge stress less than 100 MPa.

8. The electrochromic LGU of claim 1, further comprising a third substrate, a fourth substrate, and a second electrochromic material, wherein:
   the first electrochromic material is disposed between the first and the third substrate;
   the second electrochromic material is disposed between the fourth and the first substrate; and the third and the fourth substrates are attached to each other.

9. The electrochromic LGU of claim 1, wherein the first and second substrates are laminated to the first and second pieces of carrier glass with a material selected from the group consisting of polyvinyl butyral (PVB), ethylene vinyl acetate (EVA), polyurethane (PU), an ultraviolet activated adhesive, or other transparent or translucent bonding material.

* * * * *